(12) United States Patent
Presicci

(10) Patent No.: US 7,605,695 B2
(45) Date of Patent: *Oct. 20, 2009

(54) AUTOMATIC DISCOVERY AND CLASSIFICATION OF DETECTORS USED IN UNATTENDED GROUND SENSOR SYSTEMS

(75) Inventor: Joseph Presicci, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 343 days.

This patent is subject to a terminal disclaimer.

(21) Appl. No.: 11/598,912

(22) Filed: Nov. 14, 2006

(65) Prior Publication Data

US 2008/0111680 A1    May 15, 2008

(51) Int. Cl.
*G08B 29/00* (2006.01)

(52) U.S. Cl. ............. 340/511; 340/539.22; 340/539.24; 340/540; 710/110

(58) Field of Classification Search ................. 340/506, 340/511, 517, 531, 533, 540, 539.1, 539.22, 340/539.24; 710/110
See application file for complete search history.

(56) References Cited

U.S. PATENT DOCUMENTS

| | | | |
|---|---|---|---|
| 4,611,296 A * | 9/1986 | Niedermayr | ................. 700/260 |
| 5,669,393 A | 9/1997 | Faisandier | |
| 5,839,094 A * | 11/1998 | French | ........................ 702/91 |
| 5,982,290 A * | 11/1999 | Berger et al. | ................. 340/618 |
| 6,324,290 B1 | 11/2001 | Murakami et al. | |
| 6,421,354 B1 * | 7/2002 | Godlewski | ................... 370/466 |
| 7,181,557 B1 * | 2/2007 | Falik et al. | ................... 710/110 |
| 2003/0011568 A1 * | 1/2003 | Yoon et al. | ................... 345/158 |
| 2003/0067542 A1 | 4/2003 | Monroe | |
| 2003/0128126 A1 * | 7/2003 | Burbank et al. | ............. 340/605 |
| 2005/0187642 A1 * | 8/2005 | Kuo | .............................. 700/1 |
| 2005/0240682 A1 * | 10/2005 | Zhang | ............................ 710/2 |
| 2008/0114914 A1 * | 5/2008 | Cloutier et al. | ............. 710/110 |

FOREIGN PATENT DOCUMENTS

WO    WO 2005/036815    4/2005

* cited by examiner

*Primary Examiner*—Brent Swarthout
(74) *Attorney, Agent, or Firm*—Harness, Dickey & Pierce, P.L.C.

(57) ABSTRACT

An interface includes a port that communicates with one of N detectors, where N is an integer greater than 1. A classification module communicates with the port and classifies the detector as one of an analog detector and a digital detector. The classification module selectively generates detector type information based on the classification.

15 Claims, 5 Drawing Sheets

AUTOMATIC DISCOVERY AND CLASSIFICATION OF DETECTORS USED IN UNATTENDED GROUND SENSOR SYSTEMS

CROSS-REFERENCE TO RELATED APPLICATIONS

This application is a related to U.S. patent application Ser. No. 11/598,911 entitled "ROBUST TACTICAL UNATTENDED GROUND SENSOR NETWORKING" and filed concurrently herewith. The disclosure of this application is incorporated herein by reference.

FIELD

The present disclosure relates to sensor systems, and more particularly to unattended sensor systems.

BACKGROUND

Referring now to FIG. 1, intrusion detection and surveillance systems 10 include multiple sensor nodes 12 that may be deployed in remote unattended locations. A sensor node 12 includes one or more analog and/or digital detectors 14-1, 14-2, ..., 14-X that may communicate with radios 16 or transceivers, through a "sensor" 18. The radios 16 may communicate with gateways, such as situational awareness applications 20 that display sensor alarms in a geographical context.

The sensor 18 may include analog and/or digital interfaces 22-1, 22-2, ..., 22-Y (collectively interfaces 22) that are specific to a detector type (e.g. seismic or passive infrared (PIR)) or detector classification (e.g. analog or digital). A signal processing module 24 receives analog signals through respective analog interfaces and an analog-to-digital (A/D) converter 26. The signal processing module 24 also receives digital detector signals through respective digital interfaces and global positioning system (GPS) signals through a GPS module 28. A radio frequency (RF) modem 31 communicates with the radios 16 through an RF transceiver module 32.

Power consumption, cost, ease of deployment, and robustness of components are concerns for current intrusion detection and surveillance systems.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An interface includes a port that communicates with one of N detectors, where N is an integer greater than 1. A classification module communicates with the port and classifies the detector as one of an analog detector and a digital detector. The classification module selectively generates detector type information based on the classification.

In other features, a voltage divider that includes a resistance and adjusts a voltage of the interface based on the resistance in parallel with a resistance within one of the N external detectors. The classification module classifies the one of the N external detectors as one of an analog and digital detector based on the voltage. An ammeter measures a current supplied by the interface to the one of N external detectors based on the one of N external detectors classified as an analog detector.

In other features, a digital communications peripheral module requests detector type information from the one of N external detectors based on the one of N external detectors classified as a digital detector. A detector identification (ID) module generates a detector type signal of the one of N external detectors based on the classification. The detector ID module determines the detector type of the one of N external detectors based on the measurement of the current. The detector ID module determines the detector type of the one of N external detectors based on digital communications peripheral module signals.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
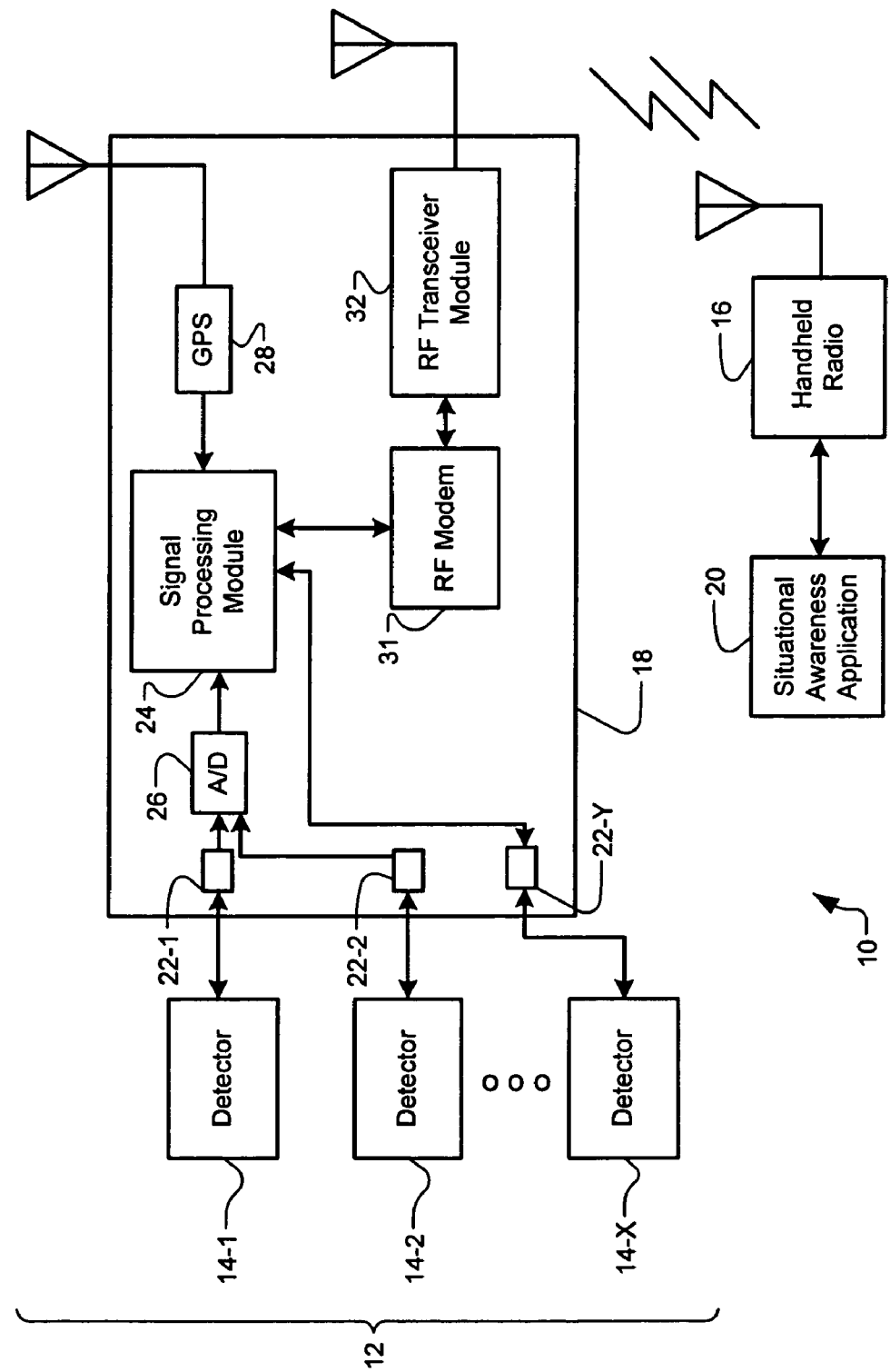
FIG. 1 is a functional block diagram of an intrusion detection and surveillance system according to the prior art.

The following description is merely exemplary in nature and is in no way intended to limit the disclosure, its application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Figure 2:
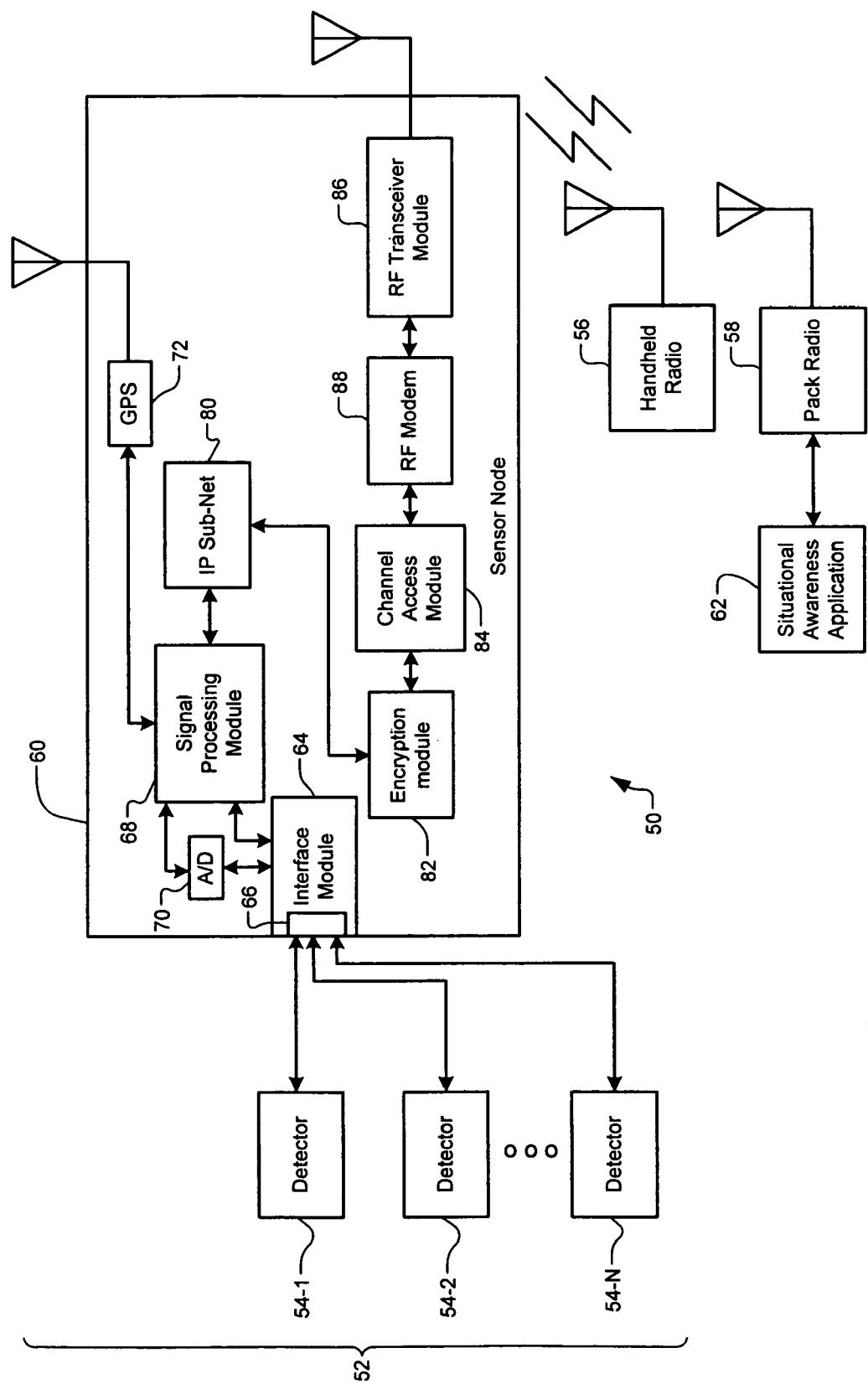
FIG. 2 is a functional block diagram of an intrusion detection and surveillance system according to the present disclosure.

Referring now to FIG. 2, an intrusion detection and surveillance system 50 includes a sensor node 52. A sensor node 52 includes one or more analog and/or digital detectors 54-1, 54-2, ..., 54-N (collectively detectors 54) that may communicate with standard military handheld and/or pack radios 56, 58, through a "sensor" 60. The detectors 54 may generate signals in response to a physical stimulus proximate to the detectors 54 and may include an internal power source or may receive power from, for example, the sensor 60. The radios 56, 58 may communicate with gateways, such as situational awareness applications 62 that display sensor alarms in a geographical context.

The sensor 60 includes an interface module 64 ("interface") that may include a universal port 66 that communicates with both analog and digital detectors 54 that may be external to the interface 64. Although only one port 66 and one interface 64 are illustrated, one or more detectors may be integrated with and/or may communicate with numerous ports and/or interfaces. The port 66 or ports may include a plurality of pin configurations that are compatible with types of analog detectors, such as passive infrared (PIR), seismic, magneto-resistive, radar, and lidar detectors and/or types of digital detectors, such as imaging and smart acoustic detectors.

A digital signal processing module 68 receives analog detector signals through the interface 64 and an analog-to-digital (A/D) converter 70. The signal processing module 68 also receives digital detector signals through interface 64 and global positioning system (GPS) signals through a GPS module 72.

The GPS module 72 may be embedded in the sensor 60 and may therefrom receive a timestamp as well as positional information. The digital signal processing module 68 in data communication with the GPS module 72 may opt to tag outgoing event messages with a timestamp of when the event occurred and/or positional information for the sensor 60. Other means for determining the current time or capturing positional information for the sensor are also contemplated by this disclosure.

An internet protocol (IP) sub-net 80 may process signals from the signal processing module 68 that may be encrypted in an encryption module 82. The IP sub-net 80 may use wireless IP voice and/or data channels that can be configured as plain text and/or cipher text, such as Citadel® encryption. A channel access module 84 determines and/or sets access to the encrypted signals for one of the radios 56, 58.

In an exemplary embodiment, the IP sub-net 80, which may include a packet converter, may receive data from the signal processing module 68. The packet converter in turn organizes the data received from the signal processing module 68 into one or more data packets. The data packets are defined in accordance with the Internet protocol or some other transport protocol. In this way, the event messages may be sent to and received by other IP compatible devices residing in a network, which may include a intrusion detection and surveillance system. It is understood that event messages need not be sent in packet form.

A radio frequency (RF) transceiver module 86 of the sensor 60 may communicate with the radios 56, 58 through an RF modem 88. These components may be designed to be compatible with existing military radio technology. In other words, each of these components may be of military grade. For example, the RF modem 88 may implement a frequency hopping scheme; whereas, the RF transceiver module 86 may be a VHF network module that operates in the frequency range from 30 MHz to 108 MHz. Exemplary RF modems and RF transceiver modules can be found in various military grade radios such as the RF-5800 handheld radio and RF-5800 manpack radios commercially available from Harris Corporation. In this way, the sensor 60 is able to communicate with handheld radios as well as other communication devices deployed within a network. This provides reduced logistics in parts and training. In addition, it minimizes the lifecycle cost of a system if the user already owns a piece of the system or has multiple users.

To reduce channel contention, the sensor 60 may also employ the channel access module 84. Channel access is the scheme by which a radio node negotiates access and is granted permission to utilize a shared communication medium. In an exemplary embodiment, the sensor node 52 may use Multiple Access with Collision Avoidance (MACA) protocol or variants thereof. It is envisioned that other channel access protocols may be employed within the broader aspects of this disclosure. However, this protocol is particularly suited for mobile communication devices which use tactical line of sight VHF channels.

Figure 3A:
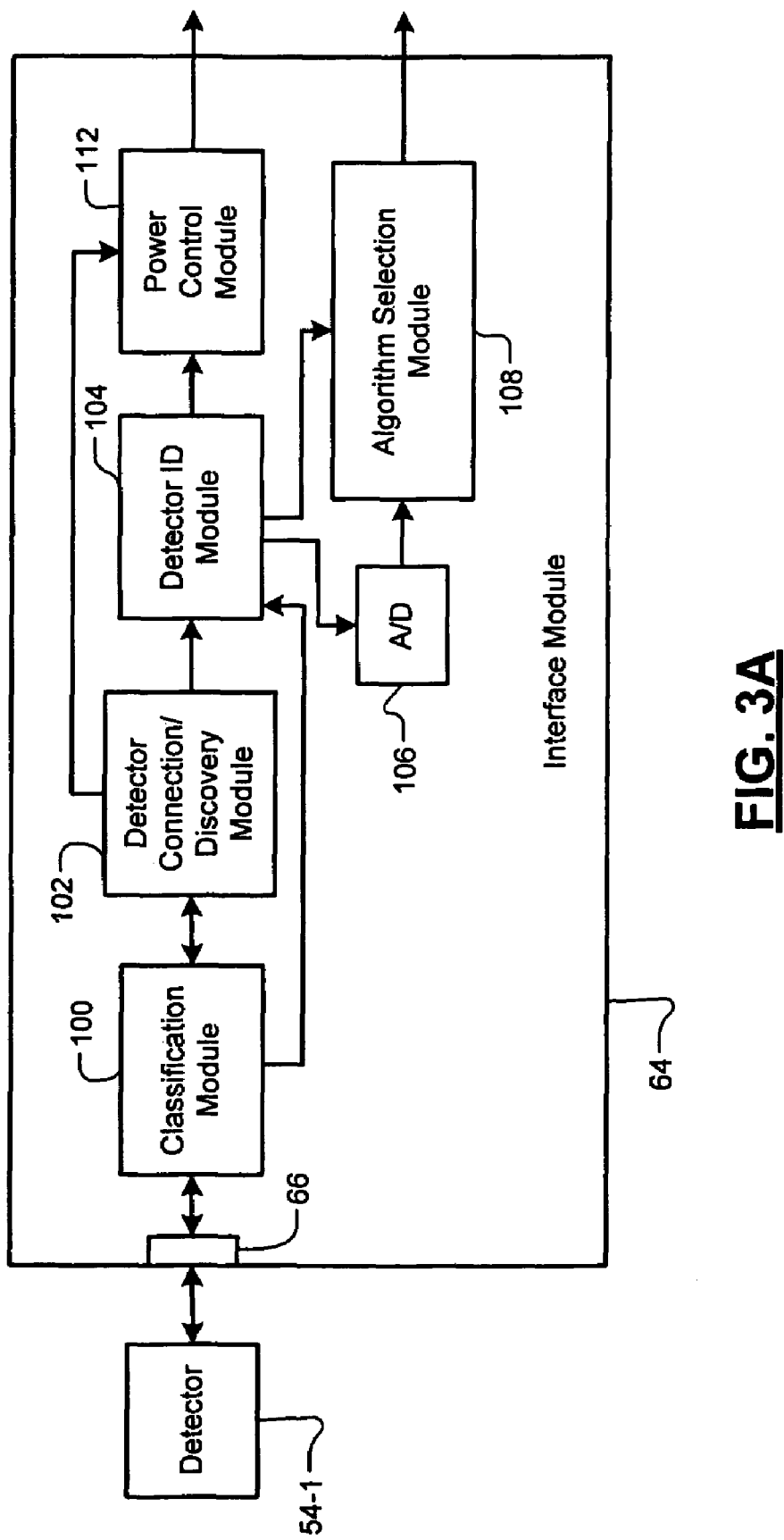
FIG. 3A is a functional block diagram of an interface according to the present disclosure.
Figure 3B:
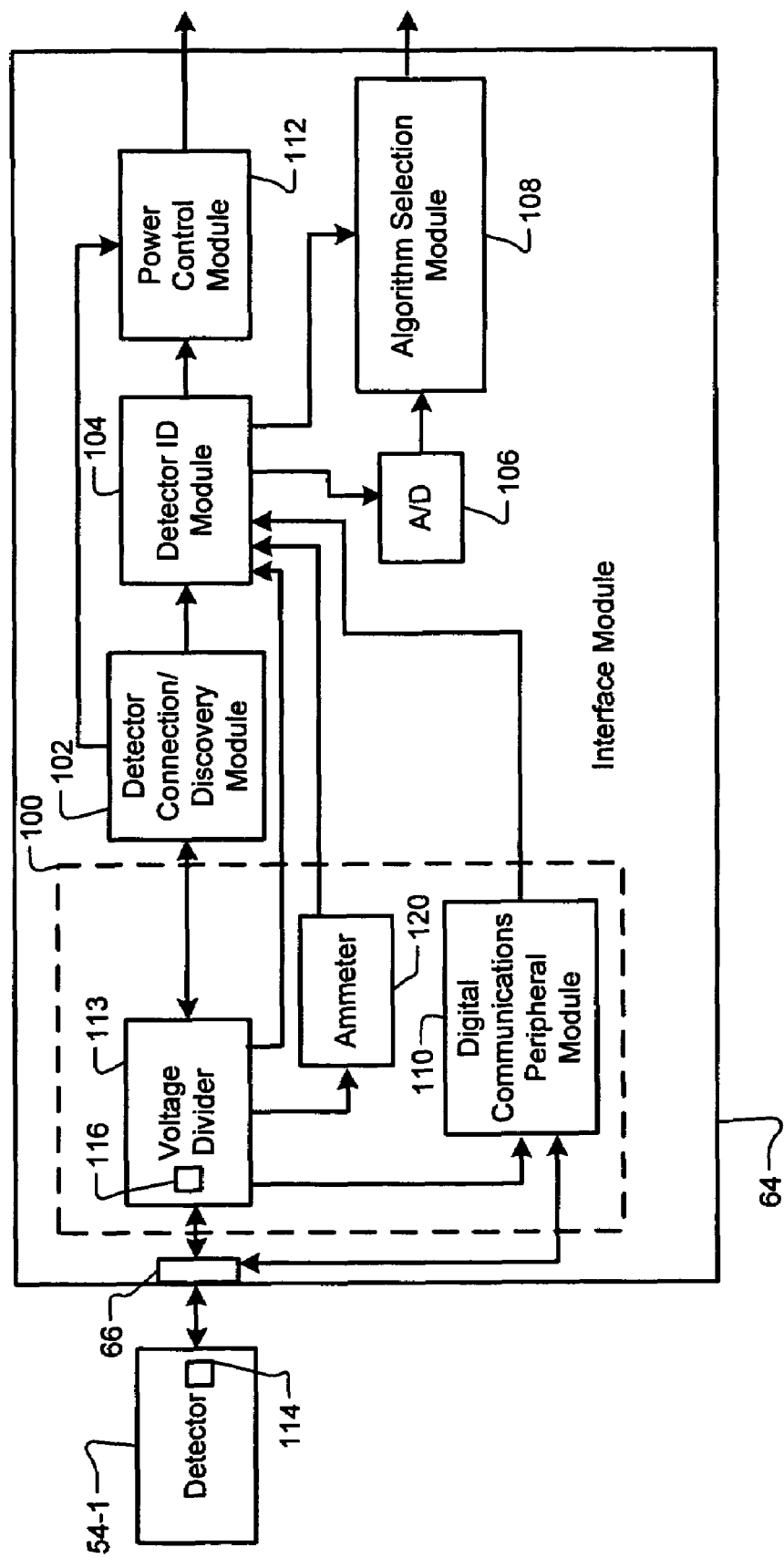
FIG. 3B is a functional block diagram of an interface according to the present disclosure.

Referring now to FIGS. 3A and 3B two exemplary embodiments of the interface 64 are illustrated. In FIG. 3A, the interface 64 may include a classification module 100 that may automatically classify that a detector 54-1 is analog or digital. The classification may be based on a predetermined indicator, such as a connection configuration between the interface 64 and the detectors 54. The classification may also be based on communications with the detector to determine that it is analog or digital. Such communications may include the classification module 100 requesting data from the detector 54-1, scanning the detector for information, or otherwise determining the classification of the detector 54-1.

A detector connection discovery module 102 may automatically determine when a detector 54-1 is connected and/or disconnected based on classification module signals and/or detector signals. In other words, the classification module 100 may send signals to the detector discovery module 102 and also to various signal processing modules within the interface 64. When receiving signals from the classification module 100, the discovery module 102 may determine that the detector 54-1 is connected and otherwise determine that the detector 54-1 is not connected or has been disconnected. Alternatively, the classification module 100 may determine that the detector 54-1 is detected based directly on signals from the port 66.

A detector identification (ID) module 104 may automatically identify the type of detector that is connected and appropriate processing steps for the detector 54-1 based on discovery module and/or classification module signals. Either or both an analog-to-digital (A/D) converter 106 and an algorithm selection module 108 process detector signals based on detector ID module signals. The algorithm selection module 108 selects an appropriate algorithm, for example, a software based algorithm, for operating the detector 54-1 and/or processing detector signals.

If the discovery module 102 classifies the detector 54-1 as an analog detector, then current supplied to the detector 54-1 may be used by the detector ID module 104 to determine the type of analog detector that is connected. If the discovery module 102 classifies the detector 54-1 as a digital detector, then a digital communications peripheral module 110, which may be part of the detector ID module 104, may communicate with and/or request identification from the detector 54-1.

Also in response to discovery module and detector ID module signals, a power control module 112 may adjust and/or activate power to the detector 54-1. In other words, the power control module 112 may control power of the detector 54-1 based on specific power requirements of the detector 54-1.

In FIG. 3B, an exemplary classification module 100 includes a voltage divider 113. When a detector 54-1 communicates with the interface 64, a load resistance 114 ($R_L$) internal to the detector 54-1 is put in parallel with resistances 116 ($R_1$, $R_2$) internal to the voltage divider 113. A voltage (Vin) may be received from the detector 54-1 or may be internal to the sensor 60 or interface 64. The resultant voltage (Vout) of the voltage divider 113 and the load resistance 114 may be determined as follows:

$$Vout = \frac{R_2}{R_1 + R_2 + \frac{R_1 R_2}{R_L}} \times Vin,$$

where $R_L$ is in parallel with $R_2$. Vout may be used to activate and/or notify the discovery module 102 when a detector 54-1 has been attached and/or removed. The resistance 114 may be a resistance resulting from a configuration of the detector 54-1 or may be an additional resistance included in the detector for detector classification and/or identification. The classification module 100 may include a table and/or logic that may actively determine whether the detector 54-1 is analog or digital. Alternatively, for Vout below (or above) a threshold, the detector 54-1 may be passively classified as analog, and for Vout above (or below) the threshold, the detector 54-1 may be passively classified as digital. For example, when above the threshold, Vout may be sufficiently high to power a digital device while analog devices may restrict power-up from such voltages.

If the resistance 114 in the detector 54-1 is uncommon and/or rare, then the voltage divider 113 may be used directly by the detector ID module 104 to determine which type of detector 54-1 is connected. In a simplified example using the above equation, a PIR detector may include a 5 Ohm resistance, whereas a seismic detector may include a 10 Ohm resistance. When $R_1=R_2=1$ Ohm and Vin is 5 V, Vout for the PIR detector may be 2.27 V; and Vout for the seismic detector may be 2.38 V. The detector ID module 104 may include a table or other categorizing system such that, assuming 2.27 V is common only to a PIR detector and/or this specific PIR detector, the detector ID module may determine the type of the detector as a PIR detector.

If the resistance 114 in the detector 54-1 is common and/or not specific to a detector but the voltage divider 113 classifies the detector 54-1 as an analog detector, then an ammeter 120 may measure the current being supplied to the detector 54-1. The measured current may be sufficient for the detector ID module 104 to determine the type of analog detector that is connected. If the resistance 114 in the detector 54-1 is not uncommon and/or rare but the voltage divider 113 classifies the detector 54-1 as digital, then the digital communications peripheral module 110 may be enabled.

The communications peripheral module 110 may establish communications with the detector 54-1 and request ID information. The detector 54-1 may include a control module (not shown) that responds to such requests. Alternatively, the communications peripheral module 110 may scan or otherwise analyze the detector for type information.

Figure 4:
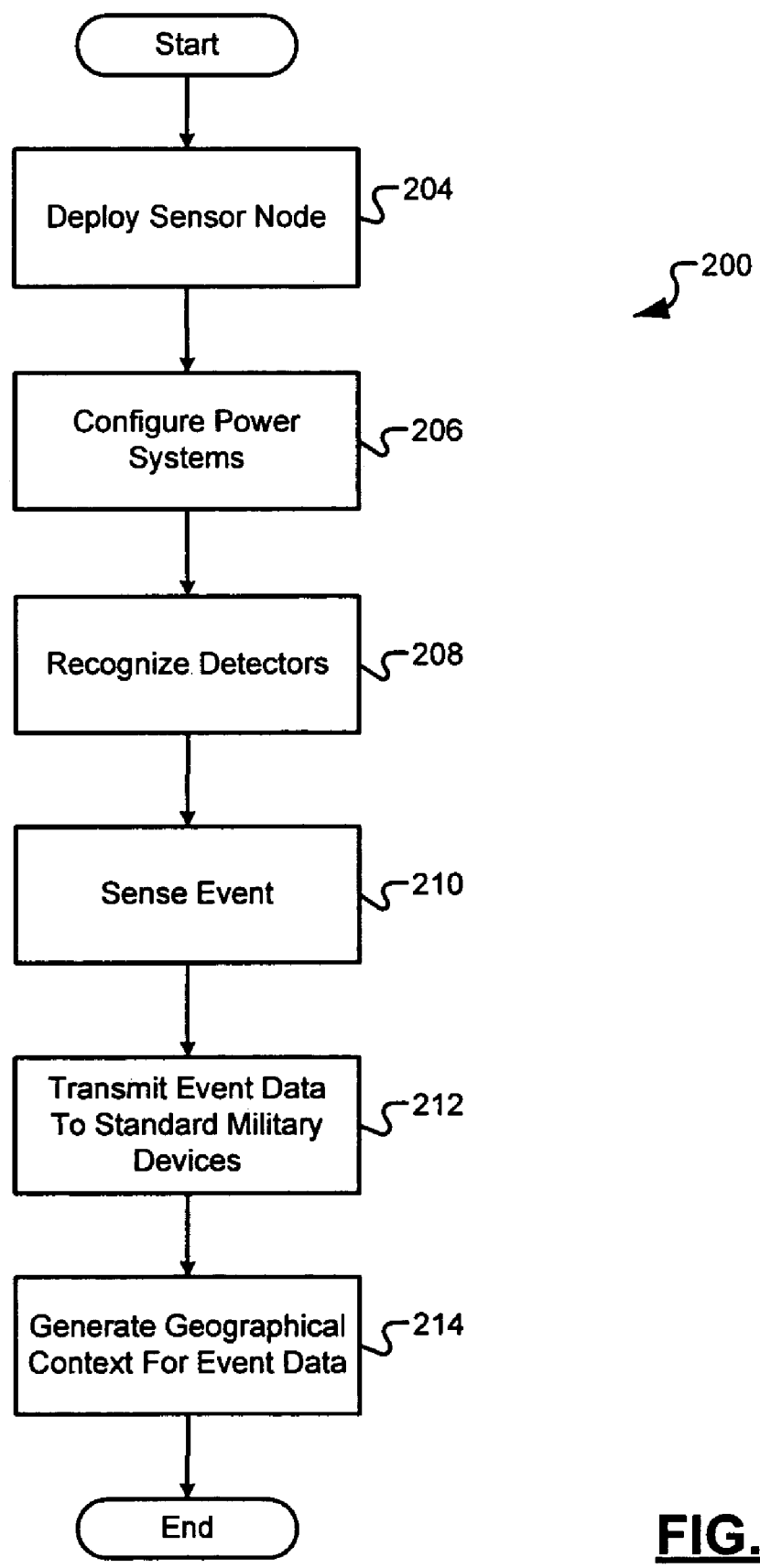
FIG. 4 is a flowchart of a method for operating an intrusion detection and surveillance system according to the present disclosure.

Referring now to FIG. 4, a flowchart 200 illustrates a method for operating an intrusion detection and surveillance system according to the present disclosure. Control starts in step 204 when a sensor node including a sensor and a plurality of detectors is deployed. In step 206, the sensor node may configure both detector and sensor power systems so that minimal power is consumed during operation of the sensor node. In step 208, the sensor may recognize (e.g. classify and determine type of) the detectors.

In step 210, following deployment, one or all of the detectors may sense an event, such as a military vehicle and/or troop movement, in a zone of detection. In step 212, the sensor node may interpret and transmit event data to standard military handheld radios and/or manpack radios. In step 214, a situational awareness application generates a visual geographical context based on handheld radio and/or manpack radio signals.

In operation, a method for operating an interface includes automatically determining that one of N external detectors communicates with the interface through a port, where N is an integer greater than 1. The method further includes automatically classifying the one of N external detectors as one of an analog detector and a digital detector. Detector type information is selectively generated based on the classification. A detector type of the one of N external detectors is automatically generated based on the detector type information. The method may further include selecting a control algorithm for processing signals from the one of N external detectors based on the detector type. The method may further include regulating power for the interface based on the detector type and automatically determining that the one of N external detectors is removed from communication with the port.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. An interface comprising:
    a port that communicates with one of N detectors, where N is an integer greater than 1;
    a classification module that communicates with said port and classifies said one of N detectors as one of an analog detector and a digital detector, and that selectively generates detector type information based on said classification, wherein said classification module comprises a voltage divider that comprises a resistance and that adjusts a voltage of the interface based on said resistance in parallel with a resistance within said one of said N detectors, wherein said classification module classifies said one of N detectors based on said voltage; and
    a detector identification (ID) module that determines a detector type of said one of N detectors based on said detector type information.

2. The interface of claim 1 further comprising a detector discovery module that determines that said one of N detectors is connected based on communications from at least one of said port and said classification module.

3. The interface of claim 1 wherein said classification module further comprises an ammeter that measures a current supplied by the interface to said one of N detectors based on said one of N detectors classified as an analog detector, wherein said detector ID module determines said detector type based on said measurement of said current, wherein said detector type information includes said measurement.

4. The interface of claim 1 wherein said classification module further comprises a digital communications peripheral module that requests digital detector type information from said one of N detectors based on said one of N detectors classified as a digital detector, wherein said detector ID module determines said detector type based on said detector type information, wherein said type identification information includes said digital detector type information.

5. The interface of claim 1 further comprising an algorithm selection module that selects a control algorithm that processes signals from said one of N detectors based on said detector type.

6. The interface of claim 1 further comprising a power control module that regulates power for the interface based on said detector type.

7. A sensor node that comprises the interface of claim 1 further comprising:
   said N detectors;
   a signal processing module that communicates with said N detectors through the interface and that is operable to generate event messages based on communications from the port;
   at least one of a global positioning system and a radio frequency (RF) transceiver that may transmit said event messages over a wireless link; and
   a channel access module operable to negotiate access to the wireless link.

8. The sensor node of claim 7 further comprising an internet protocol (IP) sub-net that processes signals from the signal processing module; and an encryption module that encrypts IP sub-net signals.

9. The sensor node of claim 7 wherein said one of N detectors comprises at least one type of detector including one of a passive infrared (PIR) detector, a seismic detector, a magneto-resistive detector, a radar detector, a lidar detector, an imaging detector, and a smart acoustic detector.

10. The interface of claim 7 further comprising a power control module that regulates power for said one of N detectors based on a type of said one of N detectors.

11. A surveillance system that comprises the sensor node of claim 7 further comprising:
   at least one of a standard military radio and a standard military pack radio that communicates wirelessly with said RF transceiver; and
   a situational awareness application that communicates wirelessly with said at least one of said military radio and said standard military pack radio and that displays data from said one of N detectors.

12. An interface comprising:
   a port that communicates with N external detectors, where N is an integer greater than 1;
   a voltage divider that comprises a resistance and that adjusts a voltage of the interface based on said resistance in parallel with a resistance within one of said N external detectors;
   an ammeter that measures a current supplied by the interface to said one of N external detectors based on said one of N external detectors classified as an analog detector;
   a digital communications peripheral module that requests detector type information from said one of N external detectors based on said one of N external detectors classified as a digital detector; and
   a detector identification (ID) module that generates a detector type signal of said one of N external detectors based on said classification, wherein said detector ID module determines said detector type of said one of N external detectors based on said measurement of said current, wherein said detector ID module determines said detector type of said one of N external detectors based on digital communications peripheral module signals.

13. The interface of claim 12 further comprising a detector discovery module that determines a connection status of said one of N external detectors based on communications from at least one of said port and said classification module.

14. The interface of claim 12 further comprising an algorithm selection module that selects a control algorithm that processes signals from said one of N external detectors based on said detector type.

15. The interface of claim 12 further comprising a power control module that regulates power for the interface based on said detector type.

* * * * *